US007215086B2

(12) United States Patent
Maxik

(10) Patent No.: US 7,215,086 B2
(45) Date of Patent: May 8, 2007

(54) ELECTRONIC LIGHT GENERATING ELEMENT LIGHT BULB

(75) Inventor: Fredric Maxik, Weston, FL (US)

(73) Assignee: Lighting Science Group Corporation, Dallas, TX (US)

( * ) Notice: Subject to any disclaimer, the term of this patent is extended or adjusted under 35 U.S.C. 154(b) by 253 days.

(21) Appl. No.: 10/915,531

(22) Filed: Aug. 9, 2004

(65) Prior Publication Data
US 2005/0237005 A1 Oct. 27, 2005

Related U.S. Application Data

(60) Provisional application No. 60/565,268, filed on Apr. 23, 2004.

(51) Int. Cl.
H05B 41/36 (2006.01)
(52) U.S. Cl. ...................................... 315/247; 315/246
(58) Field of Classification Search ................ 315/247, 315/224, 246, 291
See application file for complete search history.

(56) References Cited

U.S. PATENT DOCUMENTS

| 4,423,473 | A | 12/1983 | Kirkley |
| 4,455,562 | A | 6/1984 | Dolan et al. |
| 5,136,483 | A | 8/1992 | Schoniger |
| 5,162,696 | A | 11/1992 | Goodrich |
| 5,175,528 | A | 12/1992 | Choi et al. |
| 5,313,187 | A | * 5/1994 | Choi et al. ................... 340/331 |
| 5,358,880 | A | 10/1994 | Lebby |
| 5,585,783 | A | 12/1996 | Hall |
| 5,749,646 | A | 5/1998 | Brittell |
| D395,092 | S | 6/1998 | Vakil |
| 5,782,553 | A | 7/1998 | McDermott |

(Continued)

FOREIGN PATENT DOCUMENTS

DE 101 05 622 A1 8/2002

(Continued)

OTHER PUBLICATIONS

Fredric S. Maxik, U.S. Appl. No. 60/554,469, filed Mar. 18, 2004 for "Lightbulb Using Electronically Activated Light Emitting Elements and Method of Making Same".

(Continued)

Primary Examiner—Trinh Vo Dinh
Assistant Examiner—Hung T. Vy
(74) Attorney, Agent, or Firm—Haynes and Boone, LLP

(57) ABSTRACT

The present system for driving an electronic light generating element, includes: (i) input terminals, (ii) an input circuit coupled to the input terminals and operable to convert a sinusoidal signal to a signal independent of negative current attributes, (iii) a switch control circuit coupled to the input circuit and operable to generate a switching signal having pulses, and (iv) a switching element coupled to the input circuit and the switch control circuit. The switching element is operable to generate an output signal formed as a series of bursts having peak amplitudes above a maximum forward current rating for a duty cycle less than a maximum operating duty cycle over which an electronic light generating element may be catastrophically damaged in response to the signal independent of negative current attributes and switching being applied to the switching element. The output signal is applied to the electronic light generating element to produce light.

12 Claims, 5 Drawing Sheets

U.S. PATENT DOCUMENTS

| | | |
|---|---|---|
| 5,929,788 A | 7/1999 | Vukosic |
| 6,016,038 A | 1/2000 | Mueller et al. |
| D427,335 S | 6/2000 | Noll |
| 6,150,771 A | 11/2000 | Perry |
| 6,150,774 A | 11/2000 | Mueller |
| 6,166,496 A | 12/2000 | Lys |
| 6,211,626 B1 | 4/2001 | Lys |
| 6,220,722 B1 | 4/2001 | Begemann |
| 6,227,679 B1 | 5/2001 | Zhang |
| 6,285,119 B1 | 9/2001 | Sundhar |
| 6,293,684 B1 | 9/2001 | Riblett |
| 6,345,903 B1 | 2/2002 | Koike |
| 6,369,781 B2 * | 4/2002 | Hashimoto et al. ............ 345/60 |
| 6,371,636 B1 | 4/2002 | Wesson |
| 6,489,937 B1 | 12/2002 | Ruvinsky |
| D470,606 S | 2/2003 | Bobel |
| D470,608 S | 2/2003 | Bobel |
| D470,610 S | 2/2003 | Bobel |
| 6,548,967 B1 | 4/2003 | Dowling |
| 6,600,274 B1 | 7/2003 | Hughes |
| 6,608,453 B2 | 8/2003 | Morgan |
| 6,621,222 B1 | 9/2003 | Hong |
| D482,143 S | 11/2003 | Buschmann et al. |
| 6,674,096 B2 | 1/2004 | Sommers |
| 6,683,419 B2 | 1/2004 | Kriparos |
| 6,697,130 B2 | 2/2004 | Weindorf |
| D487,940 S | 3/2004 | Buschmann et al. |
| 6,707,247 B2 | 3/2004 | Murano |
| 6,709,126 B1 | 3/2004 | Leen |
| 6,709,132 B2 | 3/2004 | Ishibashi |
| 6,724,156 B2 | 4/2004 | Fregoso |
| D490,919 S | 6/2004 | Wiesmeth |
| D491,301 S | 6/2004 | Chen |
| D493,007 S | 7/2004 | Rugendyke et al. |
| D498,310 S | 11/2004 | Gagnon et al. |
| 6,822,397 B2 * | 11/2004 | Kawasaki et al. ....... 315/169.2 |
| D500,872 S | 1/2005 | Foo |
| D501,055 S | 1/2005 | Packard |
| 6,900,781 B1 * | 5/2005 | Mori et al. ................... 345/60 |
| D508,575 S | 8/2005 | Buschmann et al. |
| 2001/0024112 A1 | 9/2001 | Jacobs et al. |
| 2001/0055353 A1 * | 12/2001 | Rybicki et al. ............. 375/353 |
| 2002/0187570 A1 | 12/2002 | Fukasawa |
| 2003/0031015 A1 | 2/2003 | Ishibashi |
| 2003/0072145 A1 | 4/2003 | Nolan et al. |
| 2003/0090910 A1 | 5/2003 | Chen |
| 2003/0117803 A1 | 6/2003 | Chen |
| 2004/0037080 A1 | 2/2004 | Luk et al. |
| 2005/0007304 A1 | 1/2005 | Gallagher et al. |

FOREIGN PATENT DOCUMENTS

| | | |
|---|---|---|
| EP | 0 441 965 A1 | 8/1991 |
| FR | 2 586 844 | 3/1987 |
| JP | 2001 243807 | 9/2001 |
| JP | 2001 325809 | 11/2001 |
| WO | WO 2004/003869 | 1/2004 |

OTHER PUBLICATIONS

Fredric S. Maxik, U.S. Appl. No. 60/565,268, filed Apr. 23, 2004 for "Electronic Light Generating Element Lightbulb".

Fredric S. Maxik, U.S. Appl. No. 60/567,082, filed Apr. 30, 2004 for "Wide Angle Light Dispersion Electronically Activated Lightbulb and Method of Making Same".

Fredric S. Maxik, U.S. Appl. No. 60/567,226, filed Apr. 30, 2004 for "Lightbulb Using Electronic Light Generating Sources".

Fredric S. Maxik and Catherina G.M. Friderici, U.S. Appl. No. 29/224,334, filed Feb. 28, 2005 for "Flashlight".

Fredric S. Maxik and Catherina G.M. Friderici, U.S. Appl. No. 29/224,333, filed Feb. 28, 2005 for "Floodlight".

Fredric S. Maxik, U.S. Appl. No. 10/915,137, filed Aug. 9, 2004 for "System and Method for Providing Multi-Functional Lighting Using High-Efficiency Lighting Elements in an Environment".

Fredric S. Maxik, U.S. Appl. No. 10/915,138, filed Aug. 9, 2004 for "Light Bulb Having Surfaces for Reflecting Light Produced by Electronic Light Generating Sources".

Fredric S. Maxik, U.S. Appl. No. 10/915,278, filed Aug. 9, 2004 for "Lighting Element Using Electronically Activated Light Emitting Elements and Method of Making Same".

Fredric S. Maxik, U.S. Appl. No. 10/915,301, filed Aug. 9, 2004 for "Light Bulb Having Wide Angle Light Dispersion and Method of Making Same".

Fredric S. Maxik, U.S. Appl. No. 29/214,892, filed Oct. 8, 2004 for "LED Light Bulb".

Fredric S. Maxik, U.S. Appl. No. 29/214,893, filed Oct. 8, 2004 for "LED Light Bulb".

"Invitation to Pay Additional Fees" with Annex (Form PCT/ISA/206) mailed by the European Patent Office on Aug. 3, 2005 in PCT Application No. PCT/US2005/013354, 4 pages.

Fredric S. Maxik and Addy S. Widjaja, U.S. Appl. No. 29/235,139, filed Jul. 27, 2005 for "LED Light Bulb".

Fredric S. Maxik and Addy S. Widjaja, U.S. Appl. No. 29/235,140, filed Jul. 27, 2005 for "LED Light Bulb".

Fredric S. Maxik, U.S. Appl. No. 29/235,514, filed Aug. 2, 2005 for "LED Light Bulb".

PCT Search Report (Forms PCT/ISA/220 and 210) and PCT Written Opinion (Form PCT/ISA/237) mailed by the European Patent Office on Oct. 26, 2005 in PCT Application No. PCT/US2005/013354, 16 pages.

* cited by examiner

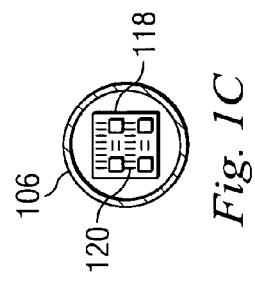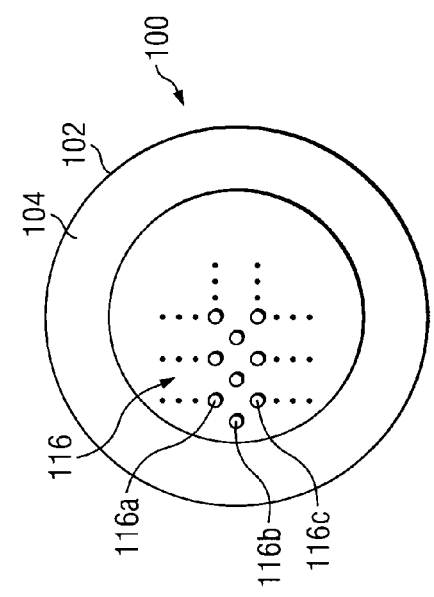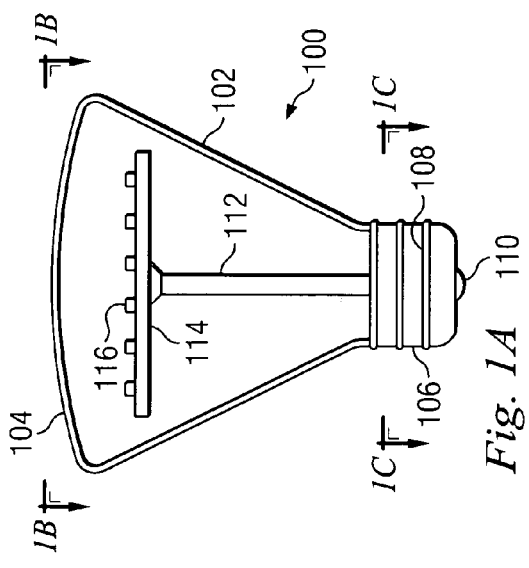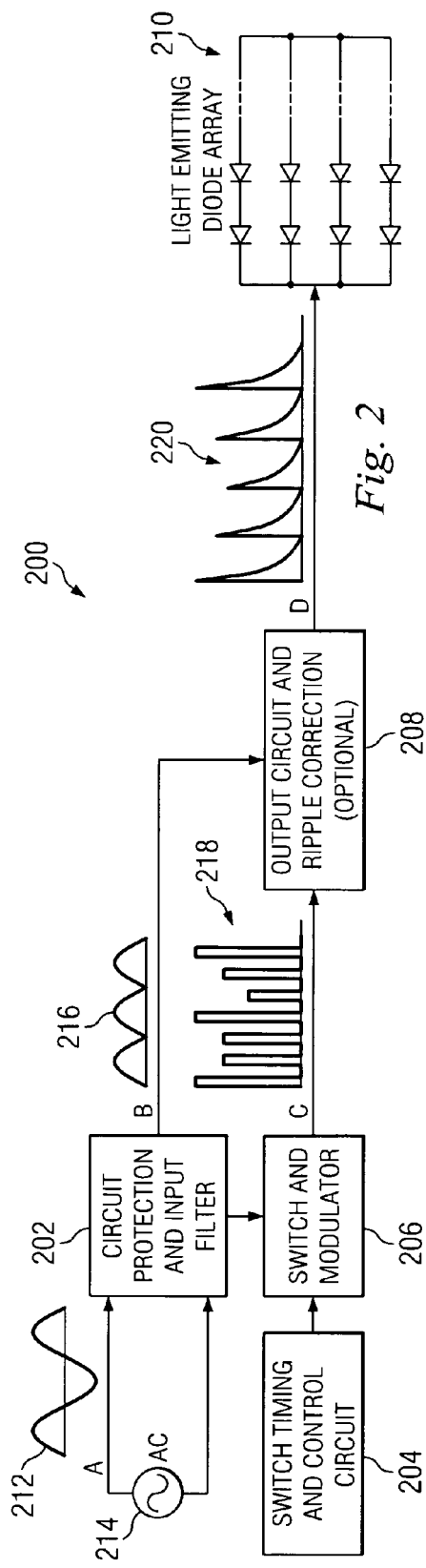

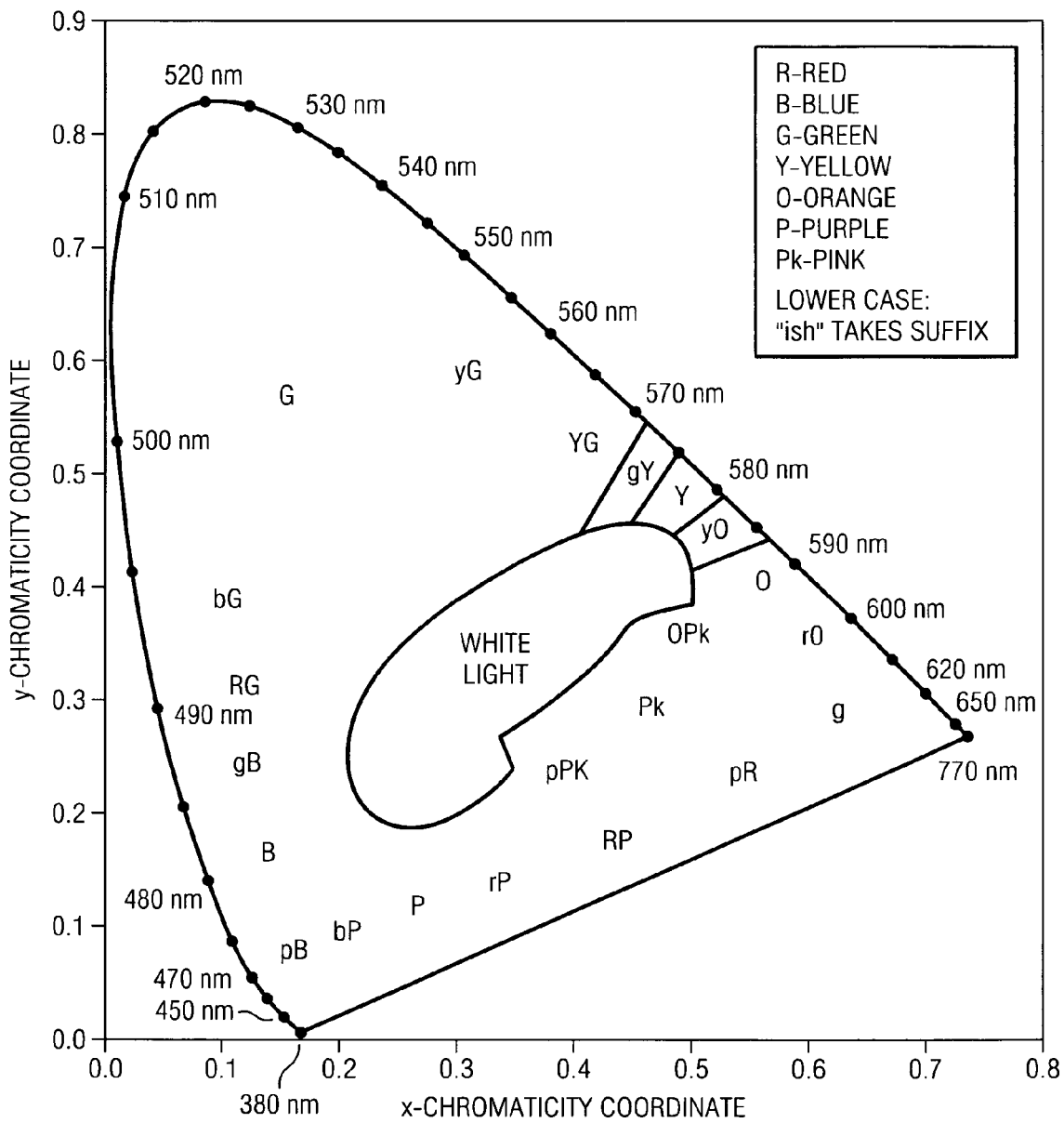

ELECTRONIC LIGHT GENERATING ELEMENT LIGHT BULB

CROSS REFERENCE TO RELATED APPLICATIONS

This application claims priority from co-pending U.S. Provisional Patent Application Ser. No. 60/565,268 titled "Improved Electronic Light Generating Element Light Bulb" and filed 23 Apr. 2004, the entire teachings of which are herein incorporated by reference. In addition, this application is related to U.S. patent application titled "Lighting Element Using Electronically Activated Light Emitting Elements And Method Of Making Same," U.S. Patent Application titled "light bulb having wide angle light dispersion and method of making same," and U.S. Patent Application titled "Light Bulb Having Surfaces For Reflecting Light Produced By Electronic Light Generating Sources," both filed on the same date hereof, the entire teachings of which are herein incorporated by reference.

BACKGROUND OF THE INVENTION

1. Technical Field of the Invention

The principles of the present invention are generally directed to a light bulb, and more particularly, but not by limitation, to a light bulb using electronic light generating elements, such as LEDs, and having circuitry for overdriving the electronic light generating elements to produce a perceived higher amount of light.

2. Description of Related Art

Since the invention of the light bulb by Edison, light bulbs have become pervasive throughout society. Light bulbs have evolved for all sorts of uses as technology for generating light has developed. Initially, an incandescent light bulb that uses a metal filament placed inside a glass bulb forming a vacuum was developed. The incandescent light bulb operates by driving current through the filament to cause the filament to heat up and produce light. While the incandescent light bulb is effective in producing large amounts of light, these light bulbs are very inefficient in that a substantial portion of the energy used to generate the light is immediate converted into heat. The inefficient use of energy is expensive and the resulting heat is generally undesirable as it can cause an individual handling the lit light bulb to receive a burn injury, especially with higher wattage light bulbs. In applications where many incandescent light bulbs are used to illuminate an occupied space (e.g., casinos, malls, retail environments, work environments, etc.), additional cooling is needed to maintain a comfortable temperature for people within that setting due to the heat produced by the lighting. Another limitation of a conventional incandescent light bulb is its limited life span. The life span problem is particularly problematic in applications where the light bulb is not readily accessible, such as in high locations or in complex fixtures, and requires manual labor and/or machine support for changing the light bulb. For example, changing traffic light bulbs, particularly those suspended from wires or located at a higher elevation, is a particularly difficult and expensive task as it requires both labor and a specialized vehicle having a lift for raising someone to a height of the traffic light to change the light bulbs.

A light emitting device developed after the incandescent light bulb is a fluorescent light emitting device. Fluorescent light is generally produced by creating electric arcs inside a gas-rich tube to produce ultraviolet light. The ultraviolet light is converted to visible light by passing the ultraviolet light through a layer of phosphor on the inside of the glass tube to cause the phosphor to glow white. Fluorescent lights have traditionally been produced in tubes having an electrode at each end for creating the electric arcs within the gas filled tube. However, more recently, fluorescent light bulbs have been developed to be compatible with an Edison-based socket and shaped as a light bulb. While the fluorescent light bulb is an improvement of the incandescent light bulb in terms of having a longer life span, the use of the fluorescent light bulb is still commercially limited due to a number of factors, including: objectionable color, efficiency concerns, limited configurations, environmental concerns, and limited life spans.

More recently, solid-state light emitting devices have been developed for light bulbs and flashlights. One such solid-state light emitting device is a light emitting diode (LED). LEDs overcome many of the problems that are found in incandescent and fluorescent lighting systems. LEDs are more durable, do not require a glass vacuum, produce significantly lower heat than any non-solid state lighting devices, and, thus, have a longer life span. However, LEDs have certain limiting factors and, thus, have not been commercially viable for general purpose lighting. Such limitations include narrow illumination beam widths at higher efficiency outputs, ultra-narrow frequency bandwidths, and lower luminance output.

Light emitting diodes are solid-state devices and produce light when an electric current passes through the device and causes electrons to recombine with holes, thereby emitting photons at a PN junction of two differently doped substrates, one negatively charged (N-type substrate) and one positively charged (P-type substrate). When current is applied to the LED and flows across the PN junction, the junction heats up. If a current exceeds a maximum specified forward current for a long enough duration of time, as defined by a manufacturer of the LED, a catastrophic failure causing complete or partial damage to the functionality of the LED may result.

To increase the brightness of LEDs while lowering the temperature of the PN junction, manufacturers of LEDs have spent much research and development time and money in producing different heat sinks and materials. Reducing the PN junction temperature improves performance of an LED as more current can be applied to the LED to produce more light without burning out the LED. While the performance of the LED has greatly improved by the use of different materials, users of LEDs must drive the LEDs within a manufacturer's specification to avoid damaging them in whole or part. The limiting factor of LED operation is the PN junction temperature. So as to not burn out an LED, the conventional technique for powering an LED includes applying a DC current below a maximum (average) forward current, which is the maximum average amount of current the LED is able to conduct in a forward bias mode. The maximum forward current for typical LED devices is about 20–30 milliamps (mA), though it may vary beyond this range. In the case of the maximum forward current being 20 mA, for direct current (DC) applications to produce a maximum illumination from the LEDs, a DC current of 19.5 mA may be used. While this technique is effective in minimizing burnout to protect the LEDs, the limited amount of luminance produced by this technique is not necessarily satisfactory for many applications using an LED light bulb. To increase the amount of illumination of the LED light bulb using a DC driving technique, manufacturers increase the number of LEDs within a single bulb structure. While the increased number of LEDs improves the light intensity of the overall light bulb, it also increases cost and size of the LED light bulbs, thereby reducing commercialization potential of the LED light bulb.

In order to reduce the thermal problems of the PN junction of the LED devices, some manufacturers have used pulse width modulation (PWM) to drive the LEDs. Pulse width modulation is a technique for driving a signal that alters the width of a pulse to change a duty cycle (i.e., ratio of ON time to OFF time within a period). By using a duty cycle less than 100 percent as is the case of using the DC driving technique, the PN junction temperature may be reduced. The human eye is generally incapable of noticing flicker of a light strobing at or above 100 pulses per second. The pulse width modulation driving technique typically operates at 100 Hz maintains a duty cycle of 30 and 60 percent or higher. This reduced duty cycle from the DC driving technique, which has a 100 percent duty cycle, maintains a lower PN junction temperature. While using pulse width modulation is an inexpensive way to convert AC light bulb applications to DC light bulb applications, the LED brightness remains limited by the PN junction temperature. In other words, by using pulse width modulation, an effective average current results such that the PN junction temperature remains below a thermal temperature that causes the LEDs to catastrophically fail. Pulse width modulation driving devices are widely available and serve as a good midpoint solution. However, as the duty cycle employed in pulse width modulation driving techniques exceed peak current ratings of LED manufacturers by 200 to 600 percent, pulse width modulation supplies and/or drivers cannot drive the LED to their maximum output without encountering the same failure mode associated with DC supplies.

Manufacturers of white LED light bulbs typically use blue or ultraviolet LEDs for generating light and use a phosphor coating on the lenses or above the wafer of the LEDs to produce visible white light similar to a fluorescent light bulb. However, such a configuration causes a loss of output efficiency because phosphor tends to backscatter the light produced by the LEDs. Also, the life of the LED light bulbs with phosphor is diminished because phosphor has a more limited life expectancy than the underlying light emitting diode. Finally, as with the fluorescent light bulb, color of the produced light is objectionable from a commercial standpoint and degrades over time.

A structural disadvantage of conventional LED light bulbs results from the use of transformers as a DC power source for driving the LEDs with a lower voltage. The use of the transformer requires the use of a large base for the LED light bulb, thereby making the conventional LED light bulbs incapable of fitting into a conventional light socket and/or having a less appealing appearance to consumers.

SUMMARY OF THE INVENTION

The heating, inefficiency, and color problems of incandescent and fluorescent light bulbs and lack of brightness, objectionable color, and unappealing physical appearance of conventional LED light bulbs are overcome by the principles of the present electronic light generating element light bulb which utilizes a circuit that does not include a transformer, uses a circuit to overdrive electronic light generating elements to produce a higher perceived amount of light, and may include at least three different colors to produce a desired color of white light. In one embodiment, the electronic light generating elements are light emitting diodes capable of producing light or any other solid-state device to have significantly improved efficiency and thermal characteristics over incandescent, fluorescent, or other traditional light bulbs. By driving the electronic light generating elements with a series of pulses, PN junction temperature that is typically the limiting factor remains lower and a higher number of pulses per second, such as a 1000 pulses per second, of overdrive current may be applied to the electronic light generating elements without causing a catastrophic failure thereof.

The principles of the present electronic light generating element light bulb include a circuit and a method for driving an electronic light generating element. The circuit may include (i) an input circuit operable to convert a sinusoidal signal to a signal independent of negative current attributes, (ii) a switch control circuit coupled to the input circuit and operable to generate a switching signal having pulses, and (iii) a switching element coupled to the input circuit and the switch control circuit. The switching element is operable to generate an output signal that is formed of a series of bursts having peak amplitudes above a maximum forward current rating for a duty cycle less than a maximum operating duty cycle over which an electronic light generating element may be catastrophically damaged in response to (a) the signal independent of negative current attributes and (b) switching being applied to the switching element. The output signal is applied to the electronic light generating element to produce light.

BRIEF DESCRIPTION OF THE DRAWINGS

The disclosed invention is described with reference to the accompanying drawings, which show sample embodiments of the invention and which are incorporated in the specification hereof by reference, wherein:

FIG. 1A is an illustration showing an exemplary electronic light generating element light bulb ("electronic light bulb");

FIG. 1B is an illustration of a front view of the electronic light bulb of FIG. 1A;

FIG. 1C illustrates an inside, front view of a base of the electronic light bulb of FIG. 1A showing an electronic circuit board having a circuit mounted thereto;

FIG. 2 is a block diagram representing circuits or modules formed of electronic components of an electronic light bulb;

FIG. 6 illustrates a CIE chromaticity diagram as understood in the art.

DETAILED DESCRIPTION OF THE DRAWINGS

Figure 3A:
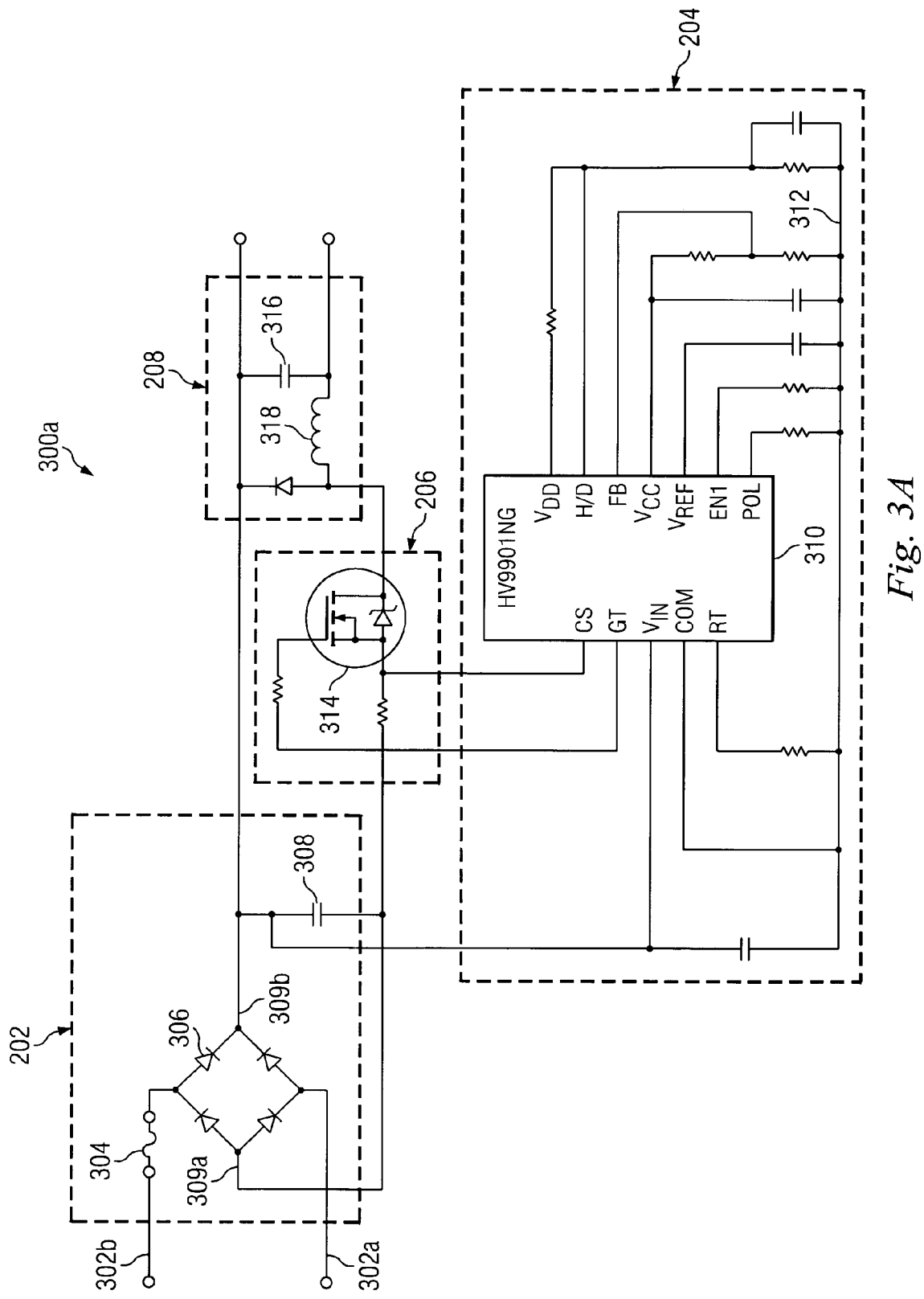
FIG. 3A is a schematic of an exemplary circuit for performing the functions of the modules of FIG. 2.

FIG. 1A is an illustration showing an exemplary electronic light generating element light bulb ("electronic light bulb"). The electronic light bulb 100 includes a housing formed of a tapered wall 102 and an outer cap 104. Although shown as a tapered wall 102, it should be understood that other non-tapered or more tapered configurations maybe utilized in forming the housing of the electronic light bulb 100. In one embodiment, the outer cap 104 is translucent. Alternatively, the outer cap 104 may be clear. Still yet, in another embodiment, the outer cap 104 may be formed of a lens that focuses, defocuses, diffuses, narrows, broadens, or performs some other optical function to the light being generated by electronic light generating elements within the electronic light bulb 100. The housing may further include a base 106 that engages or is coupled to the outer wall 102. The base 106 may be formed as a "Edison base" for connection to a conventional lamp device or the like capable of receiving electronic light bulbs having Edison bases. It should be understood that the base 106 may be shaped in other configurations for use in different standard-type or proprietary sockets. The base 106 may be externally threaded having threads 108 for screwing the electronic light bulb 100 into a socket of a light fixture. Other mounting configurations, such as a bayonet-type configuration, may be utilized in accordance with the principles of the present invention.

A contact 110, which is coupled to or disposed in relation to the base 106, may be electrically coupled to a post or stem 112 that supports a circuit board 114 having electronic light generating elements 116 mounted thereto. In another embodiment, a circuit board (see FIG. 1C) may be disposed in the base 106 (see FIG. 1C) and signals produced by the circuit board may be communicated to the circuit board 114 to power the electronic light generating elements 116. The stem 112 may be electrically conductive or may guide one or more electrical conductors from the contact 110 to the circuit board 114 to conduct electrical power and/or electronic signaling thereto. The stem at 112 further may be utilized to align or position the circuit board 114 in relation to the outer cap 104.

The electronic light generating elements may be light emitting diodes (LEDs). The light emitting diodes may be conventional light emitting diodes or organic light emitting diodes (OLEDs) as understood in the art. Alternatively, the electronic light generating elements may be any device, solid-state or otherwise, that is electronically activated to produce light. As understood in the art, organic and inorganic crystals may be electronically activated to generate a light and is encompassed by the term, "electronic light generating elements".

FIG. 1B is an illustration of a front view of the electronic light bulb 100. As shown, the outer wall 102 engages the outer cap 104, which is located optically in front of the electronic light generating elements 116. The electronic light generating elements 116 may be configured in rows and columns on the circuit board 114 (FIG. 1A). In one embodiment, the electronic light generating elements 116 include three colors that may be utilized to produce white or any other color of light based on blending colors produced by each of the electronic light generating elements 116. For example, the colors of red, green, and blue (RGB), which are primary colors, may be selected to be included in the electronic light bulb 100. As shown, groups of three electronic light generating elements 116a, 116b, and 116c (collectively 116) may be arranged in close proximity to one another to form a "pixel" of the electronic light bulb 100. By turning each of these electronic light generating elements 116a–116c on for a predetermined duration of time, the electronic light bulb 100 may produce a white light directly from the electronic light generating elements 116 rather than using a phosphor or other coating to produce the white light. By directly producing white light from the LEDs and avoiding the use of phosphor, for example, the life span of the electronic light bulb 100 is limited to the lifespan of the LEDs and not the coating.

It should be understood that the proximity of the different colors of electronic light generating elements 116 may be configured in many different ways based on the desire of the designer of the electronic light bulb 100 or the application therefor. The colors of the electronic light generating elements 116 may be selected by the designer or manufacturer and populated in the electronic light 100 for a particular application, including environmental applications. For example, to avoid attracting certain bugs, electronic light generating elements that emit wavelengths greater than 490 nm, which is the highest wavelength certain bugs can see, may be used. In another example, to kill microorganisms, such as bacteria, electronic light generating elements that produce ultraviolet light may be selected. It should also be understood that the electronic light generating elements 116 may be configured in a non-row and column configurations, such as a circular, oval, or other geometric or non geometric configuration. Still yet, while the use of three or more primary colors for producing white or other colors of light may be utilized in accordance with the principles of the present invention, conventional one or two color electronic light generating elements 116 may be utilized in accordance with increasing the brightness of the electronic light generating elements 116 as described further herein, but have lifetime and color limitations as previously described.

FIG. 1C illustrates an inside, front view of the base 106 showing an electronic circuit board 118 having a circuit 120 mounted thereto. The circuit 120 may include circuitry for receiving power from the contact 110 and generate signals for controlling the electronic light generating elements 116 (FIG. 1A). The electronic circuit board 118 may be mounted within the base 106 so as to be substantially visually undetectable by an observer of the electronic light bulb 100. However, it should be understood that the electronic circuit board 118 may be mounted to the circuit board 114 or part of or the entire circuit 120 may be integrated onto the circuit board 114 so as to collocate the circuit 120 with the electronic light generating elements 116.

FIG. 2 is a block diagram representing circuits or modules 200 formed of electronic components of an electronic light bulb. The modules 200 include a circuit protection and input filter circuit 202, switch timing and control circuit 204, switch and modulator circuit 206, and output and ripple correction circuit 208. A light emitting diode array 210 is electrically coupled to the output and ripple correction circuit 208. As understood in the art, the modules 200 may be formed by one or more electronic components.

As shown, the circuit protection and input filter circuit 202 receives an input signal 212 from an alternating current (AC) source 214. The AC source 214 may be power delivered from a wall socket (not shown) into which a lamp or other light fixture is plugged. The input signal 212 may be a substantially sinusoidal signal of 50 Hz, 60 Hz, or otherwise depending upon the country, for example. A rectified signal 216 produced by the circuit protection and input filter circuit 202 may be generated from the input signal 212 and have no negative voltage or current.

The switch timing and control circuit 204 provides an input to the switch and modulator circuit 206 as does the circuit protection and input filter circuit 202. An output of the switch and modulator circuit 206 may be a substantially periodic pulse train 218. The pulse train may be formed of individual pulses that are amplitude modulated. In other words, the amplitudes of each pulse may be raised or lowered depending on the amount of current desired to be input to the output and ripple correction circuit 208 for driving the light emitting diode array 210. An output signal 220 is shown as a substantially periodic bursts for driving the light emitting diode array 210. By driving the light emitting diode array 210 using the output signal 220 having a series of substantially periodic bursts, the LEDs of the light emitting diode array 210 are driven to a maximum luminance output, which is higher than can be achieved by using conventional pulse width modulation driving techniques that may have a thirty percent duty cycle, for example, because the output signal 220 has a duty cycle of at most ten percent. It should be understood that the maximum duty cycle for the output signal 220 may be increased or decreased based on the specifications of the electronic light generating elements selected for the electronic light bulb.

The modules 200 are capable of handling changes in line or supply voltage and/or different AC frequencies. Changes in line voltage have a moderately linear effect on the output signal 220. This linear effect may be stabilized by inserting higher value capacitors in the output and ripple correction circuit 208. A voltage swing of 20 percent or greater can result in the light either shutting off (flickering) if the voltage swing is momentary or shutting off as the fuse opens if heavy over-voltage is present. These are both unusual scenarios in the United States power grid, but are issues of concern in other parts of the world. Operating voltages of 95V–140V should not adversely affect performance. It should be understood that the principles of the present invention may include power supplies configured for markets that nominally use 100V, 220V, 240V, or any other voltage level.

FIG. 3A is a schematic of an exemplary circuit 300a for performing the functions of the modules 200 of FIG. 2. Each of the modules 202, 204, 206, and 208 are shown by dashed lines around circuitry for performing the functions of the modules 200.

The circuit protection and input filter circuit 202 includes a pair of input terminals 302a and 302b (collectively 302), a fuse 304, and bridge rectifier 306. The fuse 304 is optional, but may be utilized to prevent damage from an over-current surge to the rest of the circuit 300a. The bridge rectifier 306 may be composed of zener diodes as understood in the art. The bridge rectifier 306 operates to ensure that the current output has no negative current characteristics (i.e., all of the current cycles are positive). Other configurations of the bridge rectifier 306 may be utilized in accordance with the principles of the present invention.

A capacitor 308 may be connected to output terminals 309a and 309b of the bridge rectifier 306 for minimizing imperfections in the current signal from the bridge rectifier 306. In one embodiment, the capacitor 308 is an electrolytic capacitor having low impedance.

The switch timing and control circuit 204 includes a switch control element 310 electrically coupled to the output terminal 309b of the bridge rectifier 306. The switch control element 310 is shown as a chip. Other forms of a switching element may be utilized, including conventional analog and/or digital circuitry. Timing circuitry 312 is coupled to the switch control element 310 for providing switch timing and control for the switch control element 310. The values of the timing circuitry are selected in accordance with the specification of the switch control element 310 to provide for rapid switching of power to electronic light generating elements. In one embodiment, the timing circuitry 312 is selected and/or configured to enable the switch control element 310 to produce a switching signal (not shown) formed of a substantially periodic pulse train signal that switches at a rate of approximately one thousand times per second (i.e., 1 KHz). Other configurations of the timing circuitry 312 may be selected to cause the switch control element 310 to have switching rates, either faster or slower, but that produce pulses of light output that are at a rate greater than that observable by the human eye. For example, the switching circuitry 312 may cause the switching to occur at 500 Hz. In general, the switching rate should be greater than 100 Hz in accordance with the principles of the present invention.

The timing circuitry 312 sets the timing periods, amplitude, and voltage levels for the switch control element 310. The switching circuitry 312 responds to the switching signal and operates to drive, in part, a switching element 314. The switching element 314 may be a field effect transistor (FET). In one embodiment, the FET transistor is a MOSFET as understood in the art. The switching element 314 responds to the substantially periodic pulse train signal output by the switch control element 310 and operates to turn current flow on and off to electronic light generating elements, such as LEDs.

The output circuit and ripple correction circuit 208 includes a capacitor 316 and an inductor 318 that are utilized to balance the circuit 300a and provide inductive balance to a reactive load, such as an electronic light generating element. The capacitor 316 is optional accordance with the principles of the present invention because it is utilized to reduce the level of ripple current. As ripple does not adversely affect the electronic light generating elements, the use of the capacitor 316 is optional. However, if devices other than LEDs are utilized, ripple is compensated for by the capacitor 316. The inductor value may remain the same as it impacts circuit power factor, which is substantially independent of the load.

Figure 3B:
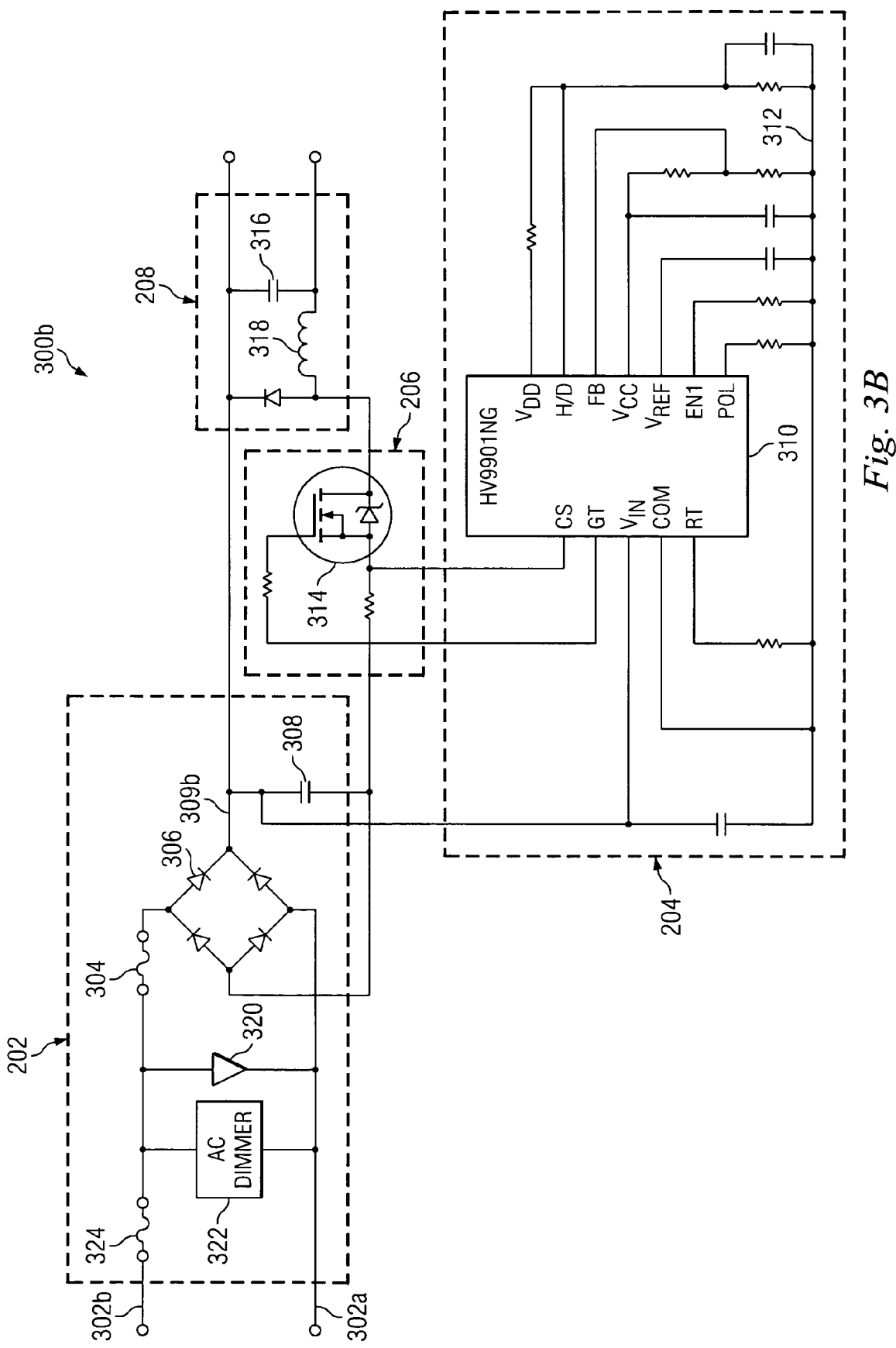
FIG. 3B is a schematic of a circuit performing the functions of the modules of FIG. 2 that further includes interacting with a dimmer as understood in the art for increasing and decreasing the light output (luminance) of the electronic light generating elements of the electronic light.

FIG. 3B is a schematic of a circuit 300b performing the functions of the modules 200 of FIG. 2 that further includes interacting with a dimmer as understood in the art for increasing and decreasing the light output (luminance) of the electronic light generating elements of the electronic light bulb. A comparator 320 is coupled between the input terminals 302 to sense a change in voltage applied by an AC dimmer 322, which also may be connected between the input terminals 302. The use of an AC dimmer is atypical for use with a circuit for driving electronic light generating elements that are typically controlled by a DC signal. Another fuse 324 may be included on one or both of the input terminals 302.

In one embodiment, the comparator 320 operates to adjust the amplitude of the switching element 314. To adjust the amplitude of the switching element 314, a comparator or feedback line may provide for adjusting the amplitude of the pulses produced by the switch control element 310. In one embodiment, a switching pattern (e.g., pulse train) may be preprogrammed into an application specific integrated circuit (ASIC) that incorporates components and/or functionality of the modules 200 and the average amplitude is adjusted by altering the amplitude of the amplitude of the pulses while the frequency of the pulses is maintained at a substantially constant rate. However, by altering the amplitude of the pulses driving the electronic light generating elements, it is difficult to maintain the linearity of the dimming because of the non-linearity of electronic light generating elements, especially if multiple colors of electronic light generating elements are utilized. For example, in the case of using LEDs for generating light, it is difficult to account for the non-linearity of the diode curves of the multiple colors.

Figure 4A:
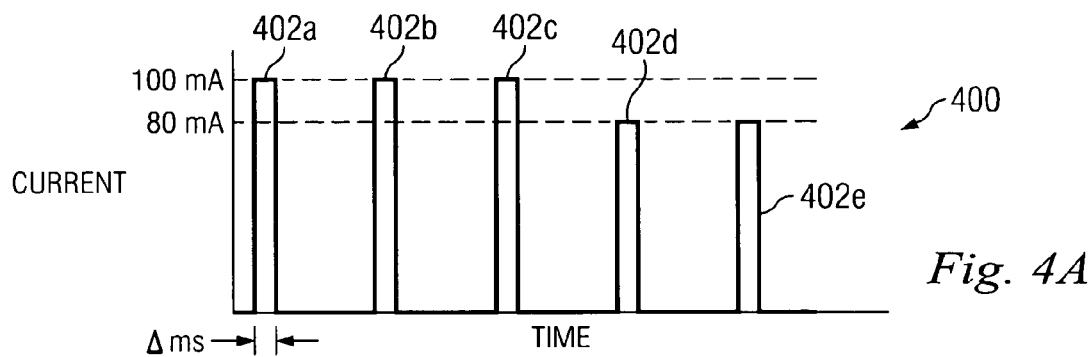
FIG. 4A illustrates an exemplary pulse train for driving and dimming electronic light generating elements by altering the amplitude of the pulses of the pulse train of FIG. 4A.

FIG. 4A illustrates an exemplary pulse train 400 for driving and dimming electronic light generating elements by altering the amplitude of the pulses. The pulse train 400 provides for current pulses 402a, 402b, 402c, 402d, 402e (collectively 402), etc. that are output from the switch control element 310 (FIG. 3) and input signals to the switching element 314 (FIG. 3). As shown, the current pulses 402a–402c have magnitudes of 100 mA and current pulses 402d–402e have magnitudes of 80 mA, each of which have a pulse width of Δ ms. In one embodiment, the pulse width is less than or equal to 0.1 ms. Pulse frequency may be set based on three factors, (i) output desired, (ii) size of the switching element selected, and (iii) electrical properties of the switching element selected, including switching speed. However, based on price/performance analysis, pulse frequency may be selected between 800 and 2.5 KHz. The pulses 402 may be operating at a frequency, where the period (P) between the pulses is 1/freq. For example, if the frequency is 1 KHz, the period between the pulses is 0.001 seconds. However, in general, the pulses 402 may be operating at a frequency at or above 100 Hz to avoid flicker.

Figure 4B:
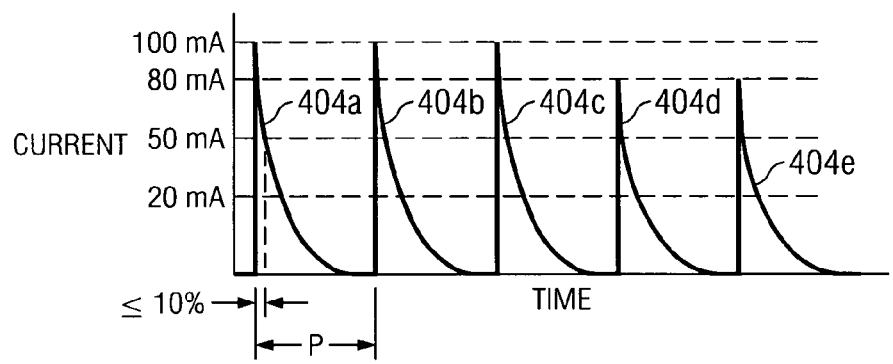
FIG. 4B illustrates exemplary output signals produced by the switching element that correspond to the pulses.

FIG. 4B illustrates exemplary output signals 404a–404e produced by the switching element 314 (see FIGS. 3 and output signal 220 of FIG. 2) that correspond to the pulses 402a–402e, respectively. As shown, the output signals 404a–404c have a peak current of 100 mA and rapidly drop off. It should be understood that the output signals shown in FIG. 4B are ideal signals and that actual output signals may include delay, ripple current, and noise.

Electronic light generating elements are not damaged by heating the PN junction if the peak of the output signals exceeds the absolute maximum rated forward current (e.g., 50 mA) for a time that is generally ten percent or less of the period P (i.e., duty cycle of ten percent or lower). However, this time range can vary depending on the parameters of the electronic light generating elements selected. As shown between output signals 404c and 404d, the magnitude of the current driving the electronic light generating elements is lowered from 100 mA to 80 mA, which correspondingly means that the duty cycle is reduced because the pulse above the absolute maximum rated forward current is reduced. The reduction of the duty cycle causes the luminance of the electronic light generating elements to be reduced in accordance with a forward current versus relative luminosity curve as specified by a manufacturer of the electronic light generating elements (e.g., from 3.5 to 3.0 a.u.).

Continuing with FIG. 3B, in another embodiment, the comparator 320 operates to adjust the timing of the pulses that the timing circuit produces to drive the light generating elements. To adjust the timing of the pulses, an output signal (not shown) from the comparator 320 to an input or other component that electrically communicates with the switch control element 310 to adjust the rate of the pulses based on the amplitude of the input signal. For example, rather than using 1000 pulses per second, the number of pulses may be reduced to 500 pulses per second. While the pulse frequency is reduced, the pulse width and magnitude of the pulses remains the same. This type of adjustment is not pulse width modulation as understood in the art. By reducing the number of pulses per second, the amount of current being applied to the electronic light generating elements remains the same from a given pulse, but the number of pulses per second is reduced linearly. By linearly adjusting the number of pulses, the overall brightness of the electronic light generating elements is linearly adjusted because adjusting the pulse frequency does not operate on the forward current to luminance output curve. Also, because the electronic light bulb according to the principles of the present invention may include three or more colors of LEDs, adjusting the timing of the pulses maintains the same color balance between each of the different colors because the pulse width and magnitude remains the same, but not applied current or excited as often. In other words, because the electronic light generating elements are not excited as often, the average light output is reduced linearly, but the maximum intensity produced as a result of each pulse remains the same.

Figure 5A:
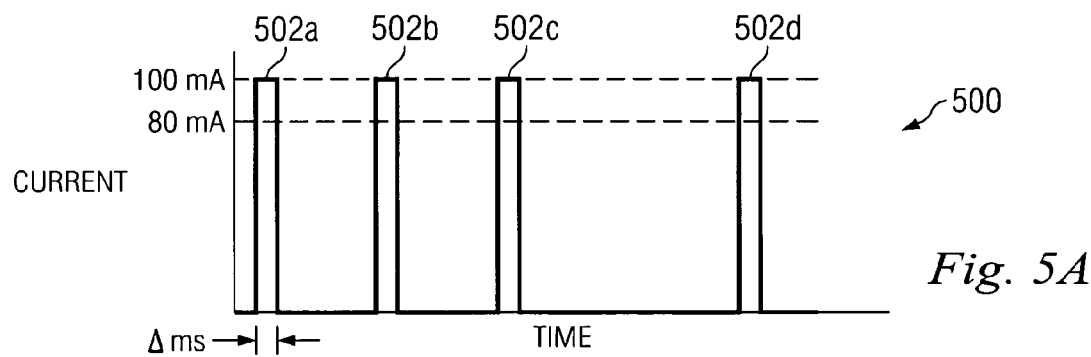
FIG. 5A illustrates an exemplary pulse train for driving and dimming electronic light generating elements by decreasing the frequency of the pulse train.
Figure 5B:
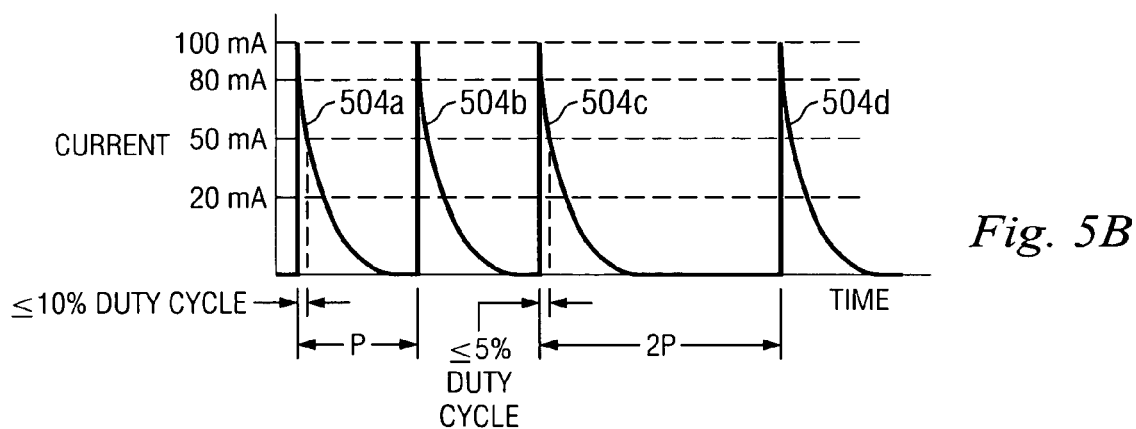
FIG. 5B illustrates exemplary output signals produced by the switching element that correspond to the pulses of the pulse train of FIG. 5A.

FIG. 5A illustrates an exemplary pulse train 500 for driving and dimming electronic light generating elements by decreasing the frequency of the pulse train. As shown, the pulse train includes for pulses 502a–502d, where pulses 502a–502c are spaced at a period (P) and pulses 502c and 502d are spaced at a period (2P). In one embodiment, the period P is 1 ms (i.e., frequency is 1 KHz). In accordance with the principles of the present invention, the pulse 502a has a width of less than or equal to 0.1 ms, which causes output signal 504a to have a peak of 100 mA and a duty cycle above the absolute maximum forward current of 50 mA, for example, of at most ten percent (10%) as shown in FIG. 5B. To reduce the light output, the frequency between pulses 502c and 502d is reduced in half and the period is doubled (i.e., 2P). By increasing the period between pulses, the duty cycle of the current peak above the absolute maximum forward current of 50 mA of at most five percent (5%). By decreasing the frequency between pulses and maintaining the pulse width and magnitude of the pulses, the luminance is decreased substantially linearly and the different colors (e.g., red, green, and blue) remain balanced. It should be understood that the specific values above are exemplary and that different electronic light generating elements may have different specifications and values.

In yet another embodiment for dimming the electronic light generating elements, a feedback circuit may be included to provide a feedback signal for feeding back the amount of current being applied to the electronic light generating elements from the switching element 314. In feeding back the information to indicate the amount of current driving the electronic light generating elements, a simple current feedback loop may be utilized as understood in the art. By feeding back the current, accurate control of the amount of current being applied to the electronic light generating elements is maintained so that linear light dimming control may be maintained even given the non-linearity of light output in response to forward current applied to the electronic light generating elements.

FIG. 6 illustrates a CIE chromaticity diagram 600 as understood in the art. LEDs and other electronic light generating elements are typically specified in terms of CIE chromaticity wavelengths. By combining multiple electronic light generating elements, specific shades of white or other colors of light maybe produced by an electronic light bulb containing the multiple electronic light generating elements. Electronic light bulbs may be populated with specific color electronic light generating elements for specific purposes. For example, a light that is invisible for bugs may use electronic light generating elements having wavelengths above 490 nanometers. By selecting and using electronic light generating elements in the electronic light bulb, the need to use an optical filter is eliminated. It should be understood that other specific purpose electronic light bulbs may be produced. For example, electronic light bulbs that produce UV light, at least in part, may be produced by selecting and populating the electronic light bulb with the proper electronic light generating elements.

The innovative concepts described in the present application can be modified and varied over a wide rage of applications. Accordingly, the scope of patented subject matter should not be limited to any of the specific exemplary teachings discussed, but is instead defined by the following claims.

What is claimed is:

1. An apparatus comprising:
   an electronic light generator having a maximum current rating; and
   a circuit producing an electric signal that drives said electronic light generator, said electric signal including a pulse train that has a plurality of first pulses and a plurality of second pulses, the amplitudes of said second pulses being less than the amplitudes of said first pulses, and said pulse train being configured as successive groups of pulses that each start with one of said first pulses and that each include at least one of said second pulses, at least some of said pulses of said pulse train having a peak current value above said maximum current rating, said output signal being in excess of said maximum current rating less than ten percent of the time.

2. The apparatus according to claim 1, wherein said pulses each have a rise time to a peak value, and have a fall time from the peak value that is longer than the rise time.

3. The apparatus according to claim 1, wherein said groups have respective time durations that are approximately equal.

4. The apparatus according to claim 1, wherein said circuit selectively varies a frequency of said pulse train.

5. The apparatus according to claim 1, wherein each said group includes at least two of said second pulses.

6. The apparatus according to claim 1, wherein said electronic light generator is a light emitting diode.

7. A method comprising generating a electric signal for driving an electronic light generator having a maximum current rating, said electric signal including a pulse train that has a plurality of first pulses and a plurality of second pulses, the amplitudes of said second pulses being less than the amplitudes of said first pulses, and said pulse train being configured as successive groups of pulses that each start with one of said first pulses and that each include at least one of said second pulses, at least some of said pulses of said pulse train having a peak current value above said maximum current rating, said output signal being in excess of said maximum current rating less than ten percent of the time.

8. The apparatus according to claim 7, wherein said generating includes causing said pulses to each have a rise time to a peak value, and to have a fall time from the peak value that is longer than the rise time.

9. The apparatus according to claim 7, wherein said generating includes configuring said groups to have respective time durations that are approximately equal.

10. The apparatus according to claim 7, wherein said generating includes selectively varying a frequency of said pulse train.

11. The apparatus according to claim 7, wherein said generating includes configuring each said group to have at least two of said second pulses.

12. The apparatus according to claim 7, including selecting a light emitting diode to serve as said electronic light generator.

* * * * *